United States Patent [19]
Niedermeyer

[11] 4,416,262
[45] Nov. 22, 1983

[54] HIGH RATIO MICROWAVE ENERGY CONCENTRATING COLLECTOR

[76] Inventor: William P. Niedermeyer, 1024 Mt. Mary Dr., Green Bay, Wis. 54301

[21] Appl. No.: 329,389

[22] Filed: Dec. 10, 1981

Related U.S. Application Data

[63] Continuation-in-part of Ser. No. 171,097, Jul. 22, 1980, Pat. No. 4,340,031.

[51] Int. Cl.³ .............................. F24J 3/02; G02B 5/08
[52] U.S. Cl. .................................... 126/438; 350/295; 350/310
[58] Field of Search ............... 126/417, 424, 425, 438, 126/439, 450, 451; 350/295, 298, 310, 3

[56] References Cited

U.S. PATENT DOCUMENTS

| | | | |
|---|---|---|---|
| 3,628,852 | 12/1971 | Snaper | 350/295 |
| 3,733,116 | 5/1973 | Hutchinson | 350/310 |
| 3,827,782 | 8/1974 | Boudoris | 350/295 |
| 3,841,738 | 10/1974 | Caplan | 126/438 |
| 3,874,773 | 4/1975 | Kurz | 350/310 |
| 3,906,927 | 9/1975 | Caplan | 126/438 |
| 4,056,309 | 11/1977 | Harbison et al. | 126/438 |
| 4,066,344 | 1/1978 | Talapatra | 350/310 |
| 4,087,682 | 5/1978 | Kolodziej | 350/295 |
| 4,093,351 | 6/1978 | Perkins et al. | 350/295 |
| 4,106,484 | 8/1979 | Dame | 126/438 |
| 4,136,671 | 1/1979 | Whiteford | 126/438 |
| 4,161,942 | 7/1979 | Monk | 126/438 |
| 4,175,835 | 11/1979 | Kuhn | 350/310 |
| 4,238,265 | 12/1980 | Deminet | 350/310 |
| 4,266,857 | 5/1981 | Svenson | 350/295 |
| 4,293,192 | 10/1981 | Bronstein | 350/310 |
| 4,331,383 | 5/1982 | Christiansen | 350/310 |

*Primary Examiner*—Daniel J. O'Connor
*Attorney, Agent, or Firm*—Francis J. Bouda

[57] ABSTRACT

A microwave energy concentrating collector having a concave paraboloid reflector surface supported on a plurality of shaped supports, said supports being parabollically shaped on the top edge and extending radially from a circle near the axis of revolution of the paraboloid to its periphery, and arranged to coact with a reference means. The reference means may, in some embodiments, be equidistant from the central axis. In others, it may be a radially extending reference.

The reference means insures accurate placement of reflector components for high accuracy focusing after assembly. It may be an indentation on the bottom edge of the supports coacting with an abutment, or it may be a vertical edge of the support coacting with an abutment. In other embodiments, the abutment may be an overhead template having a bottom edge which is parabolic in shape, said template being accurately located with respect to a horizontal reference so as to form an abutment for the parabolic shaped support. The template may also be an adjustable flexible piece installed on the top edge of said support.

30 Claims, 22 Drawing Figures

HIGH RATIO MICROWAVE ENERGY CONCENTRATING COLLECTOR

BACKGROUND OF THE INVENTION

This is a continuation-in-part of U.S. patent application Ser. No. 171,097, filed July 22, 1980 now U.S. Pat. No. 4,340,031, which relates particularly to methods for constructing concentrating type solar disc collectors.

The present invention applies to microwave energy disc collectors, with additional details showing the advantageous use of a template for accurate placement of components. The template is curved and movable relative to said disc, and is used as a guide for adjusting the final parabolic curve of the supporting structure to close tolerances.

Conventional microwave energy concentrating discs (hereinafter referred to as "satellite receivers") are expensive and require special metal fabricating techniques to accurately shape the parabolic top edge of supporting trusslike structures, or, with smaller receivers up to about 15' in diameter, expensive fiberglass forming techniques.

In the previous description and disclosure of U.S. patent application Ser. No. 141,097, I describe a disc reflector (satellite receiver), essential components of which may be made on high speed web machinery that is modified to shape parabolic supporting members according to methods described in my U.S. Pat. No. 4,266,112. The essential components or support members are used alone or in combination with a vertically adjustable flexible member that can be urged upwardly against an accurately held template having a parabolic shaped lower edge.

The use of an adjustable flexible member to make final correction to the shape of the upper parabolic edge of the planar supports is a means of compensating for all but gross inaccuracies, and within normal cutting and fabricating tolerances, permits constructin and alignment of a highly accurate disc reflector without close inspection or special fabrication or assembly techniques. As a result, large diameter reflectors of high accuracy can be constructed faster, with less labor, and depending on structural requirements, can utilize less expensive plastic components instead of metal.

It is an object of this invention to provide a parabolic satellite receiver disc wherein the completed reflector is a combination of specially fabricated parts which can be assembled in the field.

It is a further object of this invention to provide a satellite receiver at least partially made of insulating materials to avoid distortions and inaccuracies due to temperature differentials when subjected to rapid heating and cooling.

It is a further object of this invention to provide a satellite receiver that can be fabricated and assembled using automatic mass production machinery and/or automated assembly techniques to reduce total manufacturing time.

It is a further object of this invention to provide a disc reflector made of lightweight materials.

It is a further object of this invention to provide a vertically movable member which straddles the top edge of an inaccurately cut parabolically shaped support member in order to adjustably compensate for cutting, fabricating, and assembly inaccuracies.

Further objects of the invention will become clear in the description of the invention.

DETAILED DESCRIPTION

For the purpose of illustrating the invention, there is shown in the accompanying drawings a form thereof which is at present preferred, although it is to be understood that the various instrumentalities of which the invention consists can be variously arranged and organized and that the invention is not limited to the precise arrangements and organizations of the instrumentalities as herein shown and described.

In the drawings, wherein like references indicate like parts.

DESCRIPTION OF THE INVENTION

Figures 1, 2, 3:
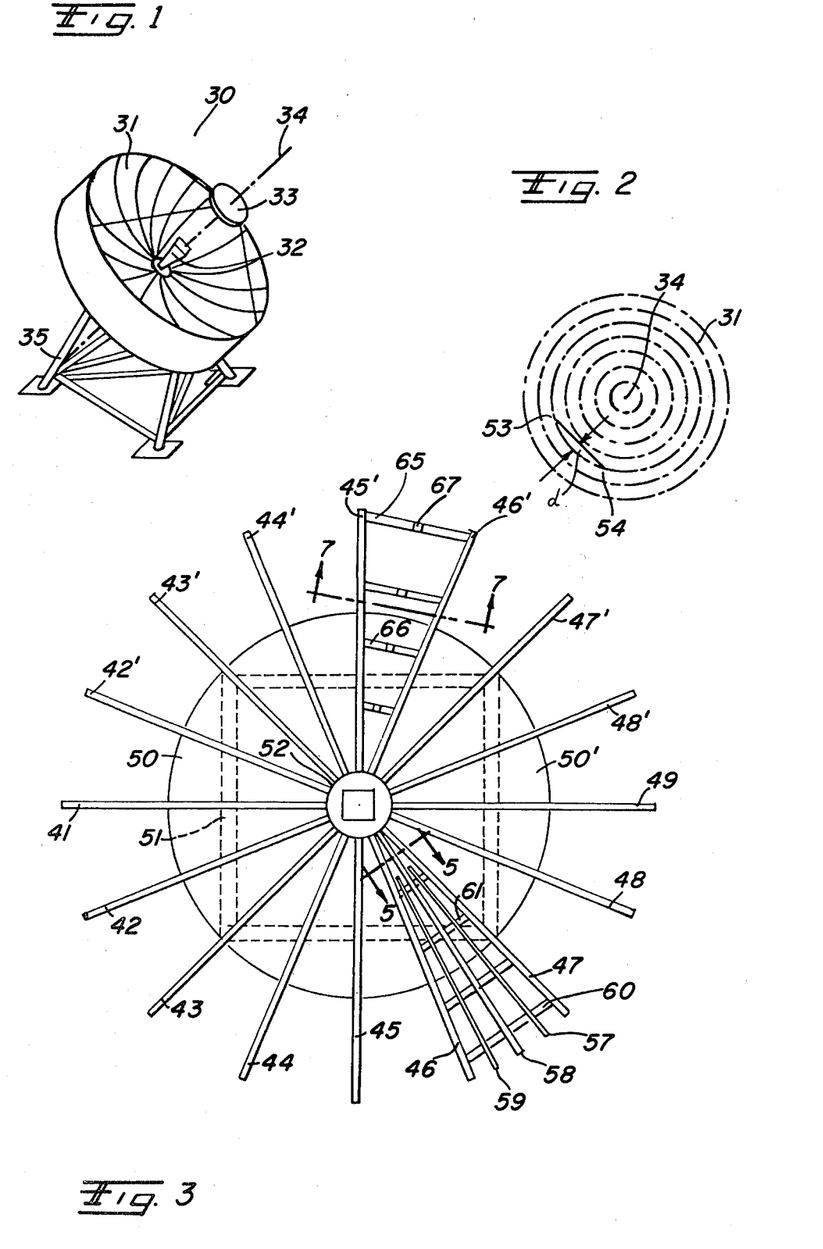
FIG. 1 is a perspective view illustrating a type of disc reflector referred to herein.
FIG. 2 is a top plan view normal to the surface of the disc reflector.
FIG. 3 is a plan view illustrating the radial supports used in constructing a disc reflector according to this invention.

FIG. 1 illustrates a high ratio microwave energy concentrating collector 30 comprising a paraboloidal disc reflector surface 31 which re-directs and concentrates impinging microwaves on receiver 32 via secondary reflector 33. Receiver 32 and secondary reflector 33 are each mounted along a central axis 34.

A tripod structure 35 can be arranged to point the central axis toward the microwave sending source, and it is to be understood that a pivoting arrangement (not shown) can be used to permit changes in aximuth and elevation for multi-point focusing.

Figure 4:
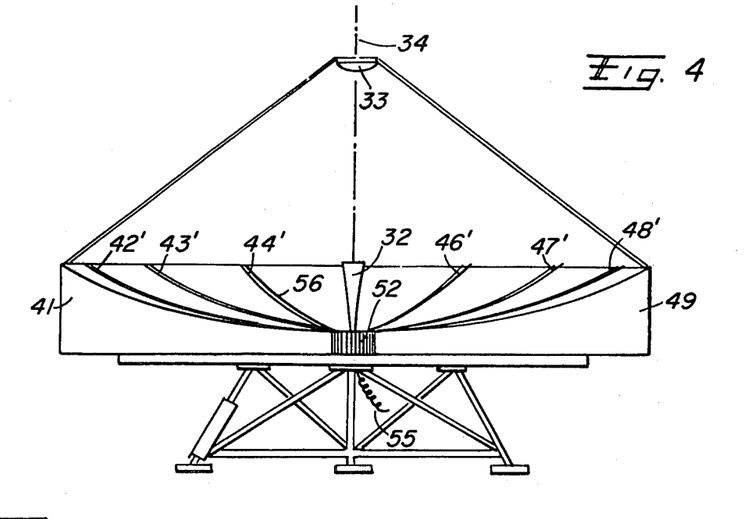
FIG. 4 is a sectional side elevation view illustrating the co-acting non-rotational sub-supports used as a base for the disc.

FIG. 2 is a schematic plan view which illustrates that any microwave falling upon the reflector surface 31 will be directed from the point of incidence on any concentric circle back to a secondary reflector 33 on line 34, it being understood that the secondary reflector 33 is not necessarily in the same plane that defines the top of the disc reflector (see FIG. 4).

FIGS. 2 and 3 are plan views as seen when looking in the same direction as incoming microwaves.

In FIG. 3, the reflector surface 31 has been removed for clarity to show the parabolic-shaped segments 41–49 and symetrically-placed supports 42'–48'. A circular sub-base (which may be formed from two semi-circular plates 50/ and 50/) is in turn bolted to a sub-structure 51. Sub-structure 51 can be prefabricated in any configuration and can be shipped to the installation site while disassembled. If necessary, the circular sub-base 50 can be made in quadrants, or smaller pieces for shipment.

In FIGS. 3 and 4, supports 41–49, etc., are shaped with the top edge 56 defining a portion of a parabolic curve, said curve being defined by formula $X^2 = 2PY$ for any value of P.

With supports 41–49 projecting outwardly along radial lines from central axis 34, both FIGS. 3 and 4 show the butting relationship when the supports start at circle 52. The diameter of circle 52 is a function of the number of supports and the thickness of individual supports, and generally, the circumference of circle 52 must be greater than the sum of the thicknesses for the plurality of supports that abut circle 52.

In FIG. 4, microwaves collected by receiver 32 are conducted to external electronic devices (not shown) by conductor 55.

In FIGS. 3 and 4, the parabolic dish is shown as having 16 supports with 22.5 degrees between adjacent supports, however, it is understood that the number of supports is a design choice ranging from a minimum of three to a maximum which depends primarily on the thickness of said supports.

Figure 5:
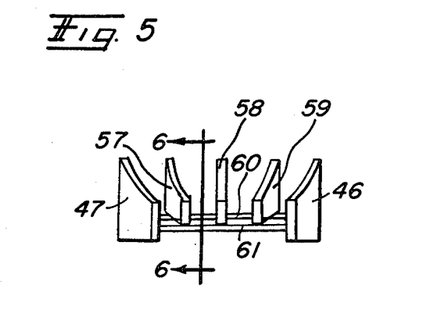
FIG. 5 is a view taken along line 5—5 of FIG. 3 showing partial secondary parabolically shaped supports being held by cross members which are attached to primary supports.

FIG. 5 illustrates how horizontal crossmembers 60–61 hold parabolic shaped supports 57, 58 and 59 in spaced relation above the base 50.

Figures 6, 8:
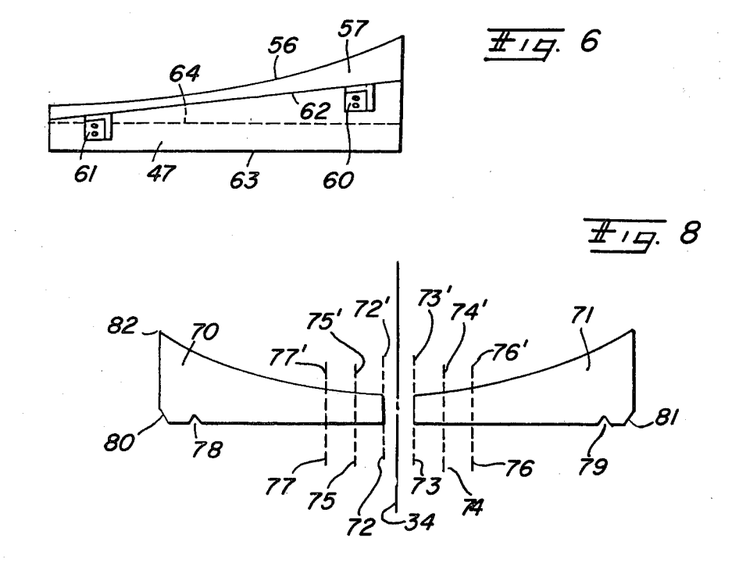
FIG. 6 is a view along line 6—6 of FIG. 5 showing the partial supports having a parabolically shaped top edge.
FIG. 8 shows fundamental changes in the length of underlying supports as well as the spaced relationship of segments as required to generate a disc reflector of paraboloidal shape according to the present disclosure.

FIG. 6 is a side view of support 57 being held in proper location by crossmembers 60–61, each of which is at a different elevation relative to the base. Alternately, bottom edge 62 can be parallel to bottom edge 63 of support 47 but displaced from it, as at 64 (shown in dotted lines).

Figure 7:
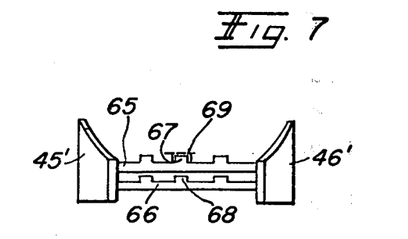
FIG. 7 is a view taken along line 7—7 of FIG. 3 showing upraised lands on the crossmembers attached to primary supports, said lands providing partial, spaced, areas for attachment of the flexible member which is urged upwardly against a fixed template.

FIG. 7 is another variation of the combination shown in FIG. 5. Crossmembes 65 and 66 can each have one or more upraised lands 67, 68, each of which are straddled by, and support, a vertically slidable member 69 at spaced points. In this instance, the top flange of the U-shaped member (shown phantom) would be of sufficient thickness to retain the shape of the upper parabolic curve (as at 56 of FIGS. 4 and 6) between the spaced support points 67–68, etc.

FIG. 8 shows the special half-parabolic supports 70–71. If the chordal error (d in FIG. 2) is to be minimized, the reflector surface must be curved, as between points 53 and 54 of FIG. 2, or it must be brought into contacting relationship with additional supports arranged such that the angle therebetween is minimized. It will be recognized that by using a maximum number of supports and a minimum angle therebetween, it may be beneficial if the reflective surface has little rigidity of itself, for example, a thin flexible sheet of plastic that is readily bendable but not limp.

As an example, when constructing a disc reflector of 33 ft. in diameter, and based on a thickness of 0.341" per support, at least three sets of reflective surface supports of different lengths should be used in order to maximize the number of supports near the center. With a total of 720 half supports, 180 of the longest supports will be in justaposed butting relationship when the inside edges are on a circle of about 19.55" (72–72' and 73–73'): and, therefore, the longest half segment will be half the disc diameter minus half the circle diameter, in this instance, about 188.23".

Since these longest supports radiate outwardly on radial lines 2 degrees apart, the space between 2 juxtaposed supports increases away from central axis 34 until the space between two supports is equal to the thickness of the supports. This occurs at a diameter represented by lines 74–74' and 75–75', and in this instance dictates that 180 intermediate supports must be about 178.45" long and radiate outwardly from a circle having a diameter of 39.1" to the outside diameter of 198.00". Again the space between the first plurality of supports and the second plurality of supports (see FIG. 10) increases outwardly from the second butting location, and as soon as this space is equal to the thickness of the supports, a third plurality of different length supports can be interjected between adjacent pairs as described hereinafter relative to FIG. 10. Additional pluralities can be added in like fashion if strength or maximum allowable distance between supports at the periphery so dictate.

In my co-pending patent application Ser. No. 171,097, a detailed description describes a method of using the cutting method of U.S. Pat. No. 4,266,112 to produce parabolic shapes of high accuracy and at high speeds on a machine that produces a substantially continuous web, i.e., continuous foamed plastic forming machines, etc. It should be recognized that even if the cut shapes 70, 71 of FIG. 8 are of desired accuracy, they must still be installed very accurately relative to the axis of revolution 34 containing the focal point.

In order to maintain close assembly accuracy in the inventive disc reflectors, a closely held reference point must be provided so that offset between cut edge 72 and zenith 82 can be rendered ineffective as a factor contributing to assembly error. In this invention, offset variations are automatically compensated for when parabolic half segments have cutouts and are placed on top of, and straddle, a reference ring (see 85 in FIG. 9), or can be in close proximity to the axis, for example, if cut edge 72 is butted against a center piece such as 83 of FIG. 9.

If the cutoff mechanism of the fabricating machinery is in register with the zenith of the parabolic segment 70, accurate alignment is possible without special precaution at the time of assembly. It is noted, however, that once the parabolic shape is cut to length, it is difficult to detect the zenith of the curve--this being especially true if very large relatively flat parabolas are made sequentially and continuously as described in U.S. Pat. No. 4,266,112. With the register marks added at the baseline (see 78 of FIG. 8), these marks will be in register or displaced register, with the zenith of the curve before and after cutting of the segment regardless of any potential misregister of cutoff with the zenith of the curve. Hence, with the reference mark (like 78 of FIG. 9), overall length is no longer critical for installed accuracy, and end trimming becomes optional instead of being necessary.

As illustrated in FIG. 7, and as described in greater detail later, less than required accuracy of the parabolic shape can be tolerated when the inverted 'U' shaped piece (69 of FIG. 7 and FIGS. 14, 15 and 16) is installed on top of the curved shape 70 but is freely slidable upwardly to butt against a template 111 of FIG. 13 having a bottom edge 106 also shaped to the required parabolic curve (like 106 in FIG. 13) before it is fixedly attached to a support member, or lands 67 of FIG. 7.

Figure 9:
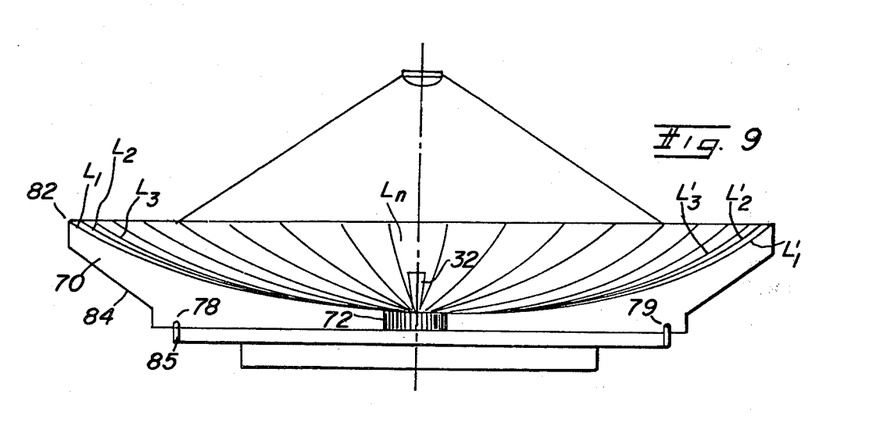
FIG. 9 is a fragmentary side elevational view of an assembled disc reflector according to this invention with the reflector surface removed for clarity.

FIG. 9 is a view like FIG. 4 and shows a greater plurality of supports $L_1, L_2, L_3 \ldots L_n$ and mating but separated pieces $L'_1, L'_2, L'_3, \ldots L'_n$ to define a concave paraboloidal shape which supports the reflective surface (removed for clarity).

Since the maximum length of the longest supports (for example 86 of FIG. 10) is less than the radius of the disc, a central opening 83 (see FIG. 9) can be advantageously used as a passage for conductors which are contained within receiver 32. After all the parabolic half-segments are assembled, an outer ring-like closure can surround the edges 84 to protect the supports from the elements. Reference marks or cutouts 78, 79, are shown in coacting relationship with an accurately-located reference "ring" 85 (see FIG. 12 for details).

Figures 10, 11:
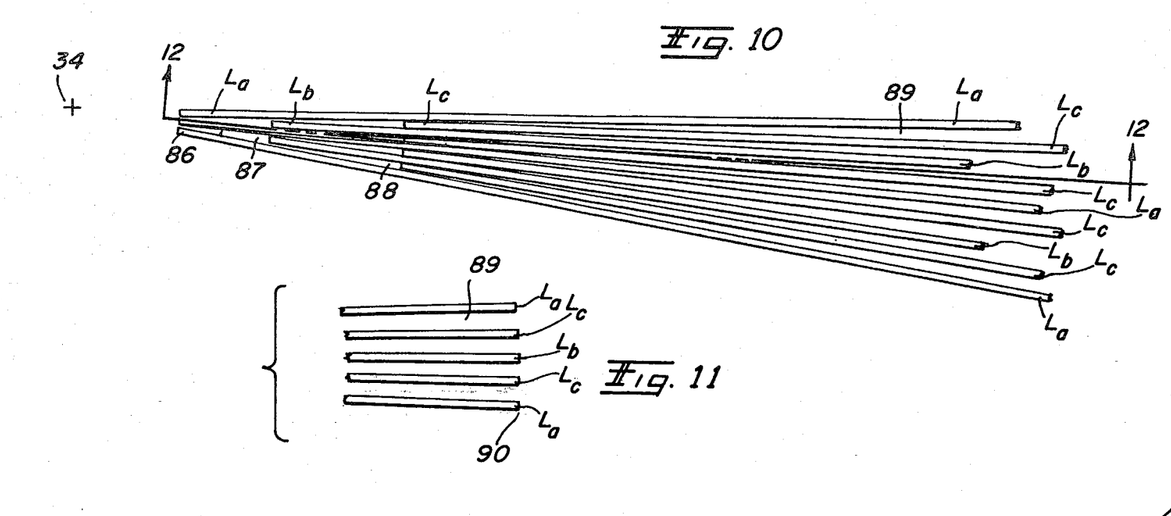
FIG. 10 is a partial plan view showing different length reflector supports radiating outwardly from the center of the disc reflector axis.
FIG. 11 is similar to FIG. 10 showing the same reflector supports terminating at vertical edges which substantially define the periphery of the reflector disc.

FIG. 10 is viewed with the axis 34 of the paraboloid being normal to the paper. Parabolic shaped supports are viewed looking at the top shaped edges of $L_a$, $L_b$ and $L_c$.

In this embodiment (FIG. 10), shaped supports of various lengths are shown—support $L_a$ being longest. For illustration, only a partial arcuate portion of the assemblage is shown, and illustrates how the longest supports $L_a$ are touching each other (as at 86) and, as they radiate toward the periphery of the paraboloid, the space 87 between two adjacent supports increases. When this gap is substantially equal to the thickness of the support, a second plurality $L_b$ of supports can be added and these radiate outward toward the periphery with increasing space therebetween. When space 88 is substantially equal to the thickness of the supports, another plurality of supports $L_c$, each of which is shorter than $L_a$ and $L_b$, can be inserted into spaces 88 between each pair of adjacent supports. Depending on the accuracy required near the periphery of the paraboloid (discussed above as chordal or arcuate reflection), additional pluralities of supports can be added.

It should be recognized that for maximum accuracy of the paraboloidal shaped inner surface, the thickness of each support should be minimum, and a maximum number of pluralities of different length supports should be used so as to effectively fill all of the "void" spaces between adjacent supports—especially near the periphery.

It is also noted that while the description covers the advantageous use of cutting on continuous web machines for high productivity, the disc-type reflector-collector (and methods described) are not limited to the use of materials, with certain embodiments being equally, if not better, suited for use of metallic components throughout, and certain other designs can advantageously use both metal and non-metallic components. For example, supports can be made of metal and intermediate supports from foamed plastics or other suitable insulators that are readily cut by water-jet cutters. Once the paraboloidal shape is generated, there are several ways to apply a reflective surface, at least one of which is described hereinafter.

Figure 12:
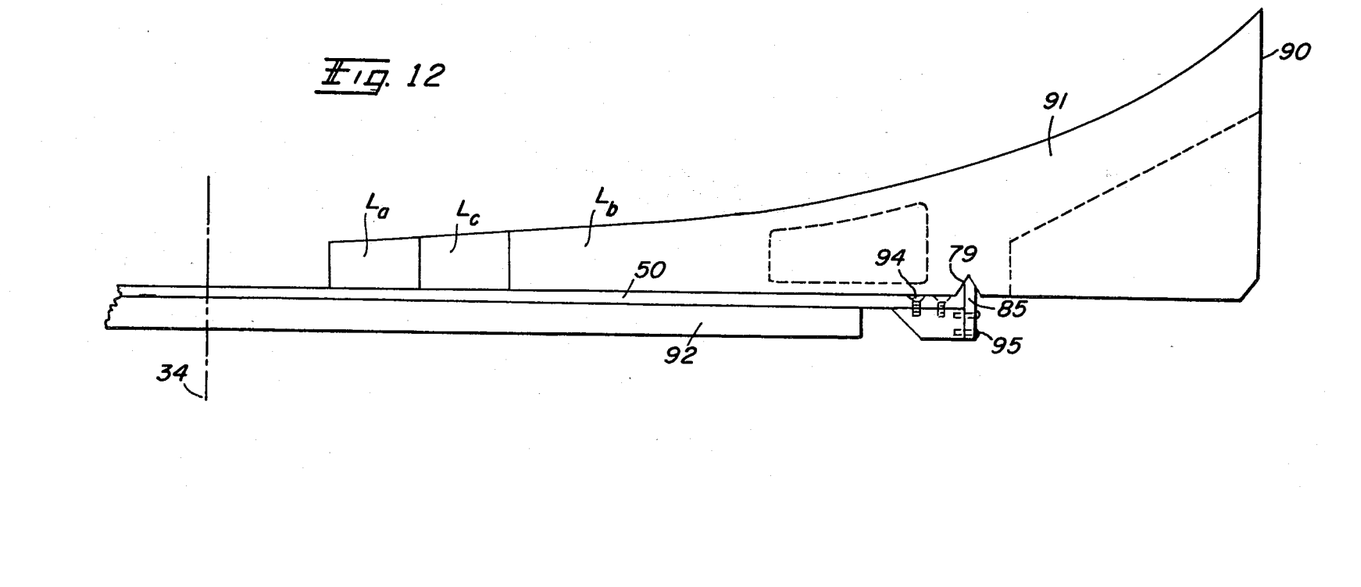
FIG. 12 is a side elevational section of certain reflector supports shown in FIG. 10.

The supports in FIG. 11 are a continuation of 5 of the supports in FIG. 10 and show how the spacing 89 increases to a maximum at edge 90 (see also FIG. 12).

In FIG. 12, support 91 is like the parabolic shape 71 of the right side of FIG. 8. Shape 91 can be comprised of members $L_a, L_c, L_b \ldots$ etc., per FIG. 10 and 11 where supports are unequal in length and are in butting juxtaposed planar relationship on more than one circle. Shaped supports $L_a \ldots L_n$ are placed on top of base 50 which, in turn, is mounted on top of sub-base 92. Reference ring 85 seats in notch 79 and is held in fixed relationship to central axis 34 by attachment to base 50 via clips 93 and fasteners 94, 95.

Figure 13:
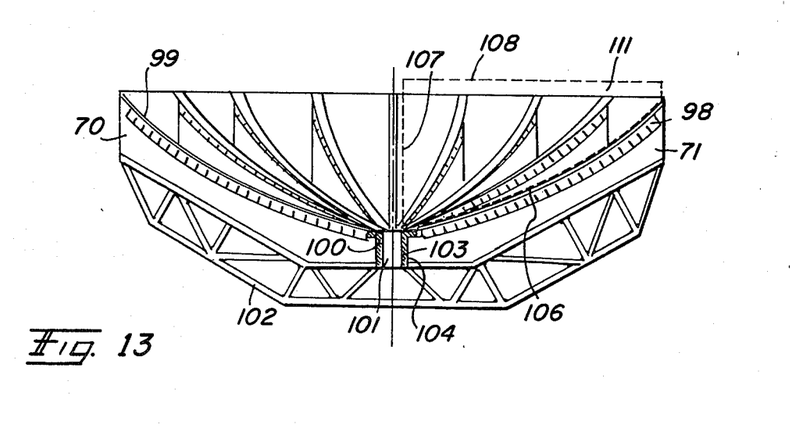
FIG. 13 is a fragmentary view showing partial supports resting upon a trusslike structure and supporting flexible members that are adjustably urged upwardly against a template.

FIG. 13 illustrates an assemblage of supports similar to FIG. 4 and shows how the flexible inverted "U" shaped piece 98 slips over the curved top surface 99 of the supports to form an area upon which the reflective surface rests and is secured by using fasteners or bonding adhesives.

A cylindrical piece 100 having a central opening 101 can be attached to the underlying trusswork 102. The outside diameter 103 is used as a reference for abutment 104 of the vertical edge of the support closest to the axis. In this embodiment, the shape of the curved surface 99 of the supports 70 . . . 71, etc., does not have to be accurate since the flexible member 98 has at least one vertically downwardly extending portion 105 (see FIG. 14) that can be secured to the supports 70, 71, etc. The flexible member may be formed from a flat horizontal strip with a plurality of tabs or legs, rather than from a "U" shaped channel.

A template 111 (shown in dotted lines) with an accurate parabolic shape 106 along its bottom edge is located very accurately such that the parabolic curve is properly oriented with respect to vertical edge 107 and horizontal top edge 108 which are parallel to the x and y axes of the plotted parabolic curve $X^2 = 2\,PY$. It follows that even if the curved top edge 99 of supports 70, 71, etc., is not accurately cut or located during assembly, the flexible piece 98 can be urged upwardly against the template before it is fixed to the support.

Thus, the sliding adjustable relationship of piece 98 relative to support 71 can be used to compensate for errors in cutting of the parabolic shape and accurate location of the support relative to axis 34 and/or other fabricating or assembly tolerances that cause other assemblage inaccuracies.

Figure 19:
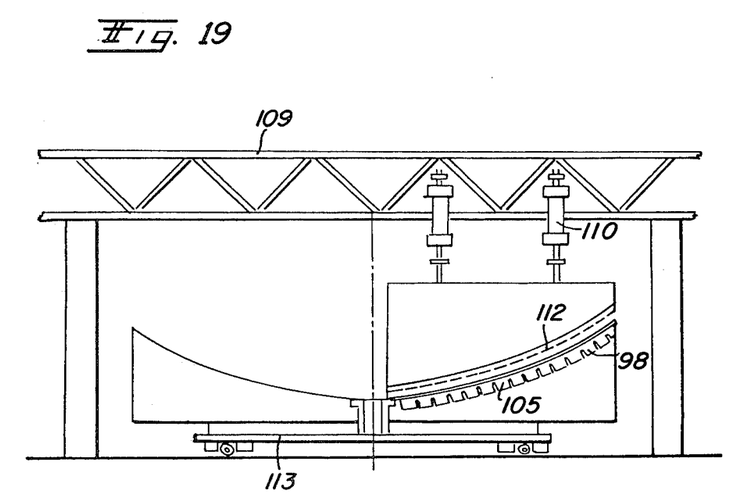
FIG. 19 shows one form of arrangement for assembling the components of the satellite receiver of the present invention.
Figure 20:
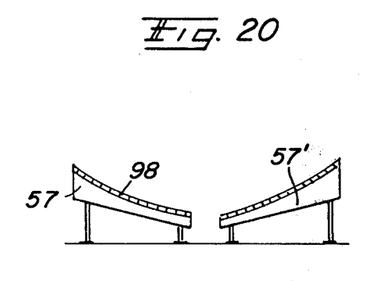
FIG. 20 is a side view showing reflector surface supports mounted on metal legs.

FIG. 19 shows how the template is accurately supported by a rigid trusswork 109 while the flexible slideable piece 98 is being adjusted upwardly during final assembly. By means of hydraulic cylinders 110 or other means, the template can be raised while the disc assembly is indexed to a subsequent position whence it is lowered to phantom line 112 for like adjustment of another flexible piece 98 on top of a subsequent and adjacent support piece 70, 71, etc., or, intermediate support pieces like 57, 58, or 59, etc.

It is essential only that location of template 111 be such that the parabolic bottom edge 106 is represented by curve $X^2=2PY$ and is accurately vertically disposed from the horizontal reference 112 which is an equivalent of the horizontal axis used to plot the curve. A turntable 113 is used to support the disc assembly during construction stages, but it is equivalent to assemble the disc on a stationary flat surface and have the template rotate to various azimuth positions and support locations for final "correction" of the shaped supports.

Figures 14, 15, 16:
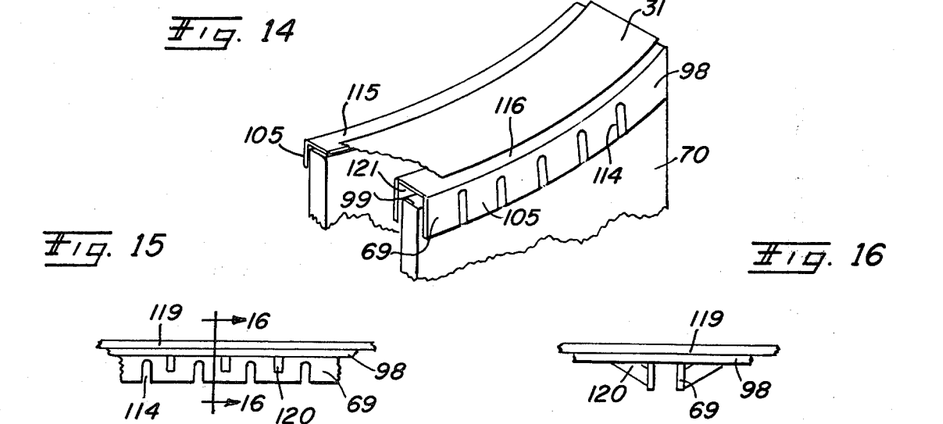
FIG. 14 is a fragmentary perspective view showing a flexible member installed on the top edge of a substantially parabolic shaped support and associated reflective surface attachment members.
FIG. 15 is a side view of one form of specially shaped flexible members used to compensate for inaccuracies in the top cut edge of the support member when installed thereabove.
FIG. 16 is a cross-sectional view taken generally along line 16—16 of FIG. 15.

FIG. 14 shows support piece 70 of metal, plastics, or other material coacting with the flexible piece 98. A formed metal or plastic strip 98 with cutouts 114 covers the top shaped edge and provides support areas 115–116 for reflective material 31.

In FIG. 15, top reflective surface 119 is placed on top of flexible strip 98 which has notches 114 and support ribs 120.

In FIG. 14, the inverted "U" shaped member 98 is shown as being slipped over the top of shaped support 70, it being understood that the inside width of strip 98 will be substantially equal to the width of support piece 70 and, after adjustment, there may be a small gap 121 between the top edge of the support and the underside of portion 115–116 as the flexible strip is adjusted upward against the template to "correct" the curve. It is not necessary that piece 98 have vertically downwardly extending portion 105 on both sides; for example, it could be L-shaped, and it is within the scope of this invention that the flexible pieces take other shapes that still permit the basic function of urging the top surface thereof against an overhead template.

Figure 17:
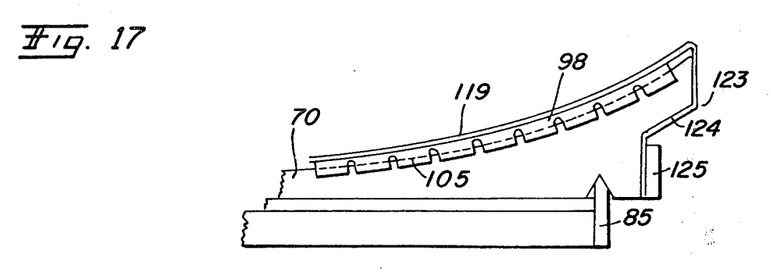
FIG. 17 is a partial side view of a support showing details of construction and assembly relative to one type of abutment means.

FIG. 17 shows a support 70 properly positioned relative to the central axis 34 by the straddling relationship of notch 79 over ring 85. Strip 98 and the reflective surface 119 are attached along the shaped top edge and are bent downward to reach point 123 at the periphery. Tape or other bendable pieces can be wrapped around the top and/or periphery of the disc reflector.

Peripheral pieces 124 and ring 125 simply protect the edge of the reflector from the weather.

Figure 18:
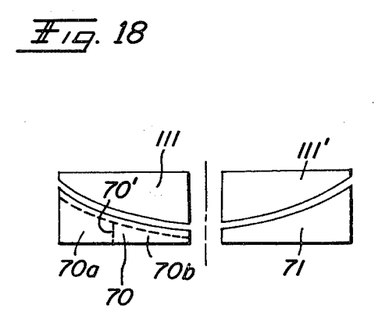
FIG. 18 shows the basic relationship of the parabolic supports relative to similar shaped and spaced templates mounted overhead.

FIG. 18 shows the basic relationship of the supports 70–71 and the co-acting templates 111–111' before the flexible piece 98 (not shown) is adjusted upwardly, and it will be appreciated that when tabs 105 of the flexible piece 98 are long enough, gross inaccuracies of the top edge from a parabolic shape can be compensated for.

Figure 21:
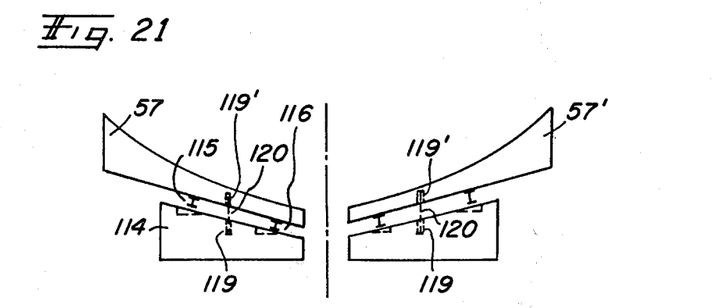
FIG. 21 is a schematic view illustrating the use of straight or circular crossmembers to minimize the number of primary supports and the advantageous use of a plurality of smaller partial supports to complete the reflective surface support structure.

FIG. 21 shows how supports 114 establish the base of the structure. Crossmembers 115–116 can be straight and therefore chordal between two adjacent supports, or can be arcuate/circular.

In effect, the combination of primary supports and crossmembers can be selected for the required rigidity. The crossmembers provide spaced apart support areas for upper (secondary) supports 57–57' which can be added at a number of azimuth positions as required to define a substantial plurality of reflective surface supports which have their upper edges shaped in parabolic form, or, in combination with flexible members 98 (not shown), which can be adjusted to provide a parabolically shaped upper edge for support of the reflective surface.

Figure 22:
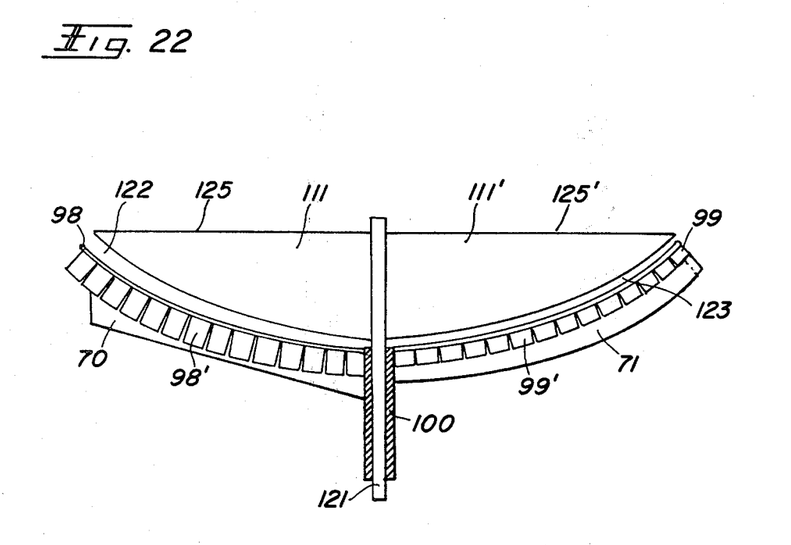
FIG. 22 is a side elevation sectional view similar to FIG. 13 with supports attached to central hub.

FIG. 22 is a sectional view similar to FIG. 13 with trusswork 102 eliminated. The central hub 100 can accommodate a vertical shaft 121 to which templates 111 and 111' are attached such that the top edges 125 and 125' are perpendicular to the axis of the shaft, and therefore perpendicular to the axis of the paraboloid.

To illustrate the advantageous use of flexible top pieces 98 and 99, the gap 122 (left side of FIG. 22) is shown to be much larger than gap 123. The difference would occur if support 70 on the left were installed lower than a preferred distance below the template, with the free end substantially lower than the template. Support 71 (shown curved) is shown installed in a normal location relative to the template. The vertical height (depth) of tabs 99' is adequate to allow upward movement of flexible piece 99 such that the smaller gap 123 will disappear when flexible piece 99 is in contact with the template. On the left side, a flexible piece 98 with extended tabs 98' can be used to eliminate the longer gap 122 when flexible piece 98 is in contact with the template 111.

The tabs 98' and 99' are attached to supports 70 and 71 respectively after contact by the flexible members 98 and 99, with the templates 111 and 111'. Support 71 is curved to show that bar stock with vertical planar sides can be bent into the approximate parabolic shape before final correction.

It is noteworthy that the upper surface of supports 70, 71, or other upper supports of the various embodiments do not have to be parabolic, nor even inclined, if tabs 98 and 99 in contact with the planar sides of 71, 70, etc., are sufficiently long. Optimum rigidity of the combination support-flexible member structure suggests that supports be substantially parabolic.

In another embodiment of FIG. 21, a plurality of circular supports (crossmembers) can rest upon cutout portions 117–118 of the primary supports. Such cutouts can have major horizontal bottom surfaces in order that rolled bar stock would uniformly rest on said horizontal surfaces at spaced intervals corresponding to its contacting relationship with the primary supports. It is understood that the top surface of the circular crossmember supports can be above the top surface of the primary support.

In yet another embodiment of FIG. 21, vertical slots 119 (cutouts) in primary supports and 119' in the upper (secondary) supports can accommodate and hold a circular "band" supporting ring 120. Only one band support 120 is shown, but it will be appreciated that at least two circular crossmembers and related slots in each primary support would be required to properly support the plurality of secondary (upper) supports mounted thereabove. It is also possible that supports 114 can be connected to a central "hub" (like 100 in FIG. 13) rather than rest on the bottom edge.

It is understood that the present invention may be embodied in other specific forms without departing from the spirit or special attributes hereof; and it is, therefore, desired that the present embodiments be considered in all respects as illustrative, and therefore not restrictive, reference being made to the appended Claims rather than to the foregoing description to indicate the scope of the invention.

Having thus described my invention, what I claim as new and desire to protect by Letters Patent are the following:

1. A concentrating microwave energy collector comprising:
   a disc reflector having a surface which is a paraboloid of revolution;
   an energy absorbing means along the axis of revolution and arranged for energy transfer to a conductor operatively connected thereto;
   said disc reflector including a plurality of fixed radially extending supports, each having a top inclined surface, and also having side planar surfaces disposed parallel to said axis;
   a plurality of flexible members mounted above said supports and having tab portions in vertical planar contact with the side surfaces of said supports and being vertically slideably adjustable relative thereto; said supports and flexible members being operatively adjustable in parabolic relationship relative to the axis of revolution; said tabs being affixed to said supports after said adjustment;
   and a microwave energy reflective surface installed on top of said flexible members.

2. The devide of claim 1 wherein said top surface is inclined and forms an angle of less than 90 degrees relative to the axis of revolution.

3. The device of claim 2 wherein said top surface is a parabolic curve.

4. The device of claim 1 wherein said supports are placed upon a trusslike base.

5. The device of claim 4 wherein said supports are integral parts of said trusslike base.

6. The device of claim 1 wherein the bottom surface of at least three of said supports are perpendicular to the axis of the paraboloid.

7. The device of claim 1 wherein at least three supports are perpendicular to the axis of the paraboloid and at least one intermediate support rests on a plurality of horizontal crossmembers which are in contacting relationship with at least two of said supports.

8. The device of claim 7 wherein each crossmember is a continuous ring disposed concentrically about the axis of the paraboloid.

9. The device of claim 7 wherein each of said horizontal crossmembers has at least one raised area on its top surface, said raised areas providing vertical planar surfaces for attachment of a flexible member.

10. The device of claim 1 wherein at least one of said supports is made of non-conductive material.

11. The device of claim 1 wherein at least one of said supports has a straight edge.

12. The device of claim 11 wherein an abutment is disposed along said straight edge.

13. The devide of claim 12 including a circular member disposed concentrically about the axis of the paraboloid and coacting with said abutment.

14. The device of claim 11 wherein a substantially vertical edge of each support butts against a coacting reference point, said reference points being disposed concentrically about the axis of the paraboloid.

15. The device of claim 1 wherein the planar surfaces of said supports contact each other at one end.

16. The device of claim 15 wherein the line of contact is at different radii for some of said supports.

17. The device of claim 16 wherein some of said supports are smaller in a radial direction than other supports.

18. The device of claim 1 wherein said radially extending supports rest upon crossmembers that are in contact with at least three underlying members which extend radially from the center of the paraboloid.

19. The device of claim 1 wherein said supports have curved upper and lower surfaces.

20. The device of claim 18 wherein crossmembers contact cutouts in the upper and lower supports.

21. The device of claim 18 wherein said crossmembers are a plurality of concentric circular members.

22. The device of claim 1 wherein said supports are fixedly attached to, supported by, and radiate from a central hub.

23. The device of claim 1 wherein all coacting components are molded in one piece.

24. The device of claim 1 wherein said reflector surface is made from a plurality of wedge-shaped sheets.

25. The device of claim 1 wherein said reflector surface is a single piece of thin gauge material.

26. The device of claim 1 wherein the reflector surface is a multi-ply sheet.

27. The device of claim 1 wherein the reflector surface is at least partially metallic.

28. The device of claim 1 wherein said reflector surface is integral with said flexible members.

29. The method of constructing a paraboloid of revolution for microwave energy collection, including the steps of:
   arranging a plurality of reflector surface supports having a first upper surface in radial arrangement about the axis of a paraboloid and having planar surfaces parallel to and coincident with said axis;
   mounting a plurality of flexible members above said first surface of said supports with vertical portions in contact with planar vertical surfaces of said supports;
   urging said flexible members upwardly against a fixed template which has a parabolic shaped bottom edge;
   fixing said flexible members to said supports;
   covering said flexible members with a sheetlike member which conforms to the contours of the flexible members;
   supporting a microwave energy receiver along the axis of the paraboloid above the sheetlike member;
   connecting said receiver to a conductor.

30. The method of claim 29 wherein the first upper edge of said supports is curved.

* * * * *